United States Patent [19]

Yamada

[11] Patent Number: 4,651,225
[45] Date of Patent: Mar. 17, 1987

[54] PICTURE IMAGE SCANNING AND REPRODUCING METHOD AND SYSTEM THEREFOR

[75] Inventor: Mitsuhiko Yamada, Kyoto, Japan

[73] Assignee: Dainippon Screen Seizo Kabushiki Kaisha, Kyoto, Japan

[21] Appl. No.: 629,713

[22] Filed: Jul. 11, 1984

[30] Foreign Application Priority Data

Jul. 19, 1983 [JP] Japan ................. 58-130350

[51] Int. Cl.$^4$ ............................. H04N 1/04
[52] U.S. Cl. ...................... 358/287; 358/289; 358/283; 358/298
[58] Field of Search ............... 358/280, 282, 285, 289, 358/293, 287, 283, 298

[56] References Cited

U.S. PATENT DOCUMENTS

| | | | |
|---|---|---|---|
| 4,454,537 | 6/1984 | Okada et al. | 358/287 |
| 4,533,958 | 8/1985 | Herget | 358/287 |
| 4,561,024 | 12/1985 | Tamura | 358/287 |

*Primary Examiner*—Edward L. Coles, Sr.
*Attorney, Agent, or Firm*—Hayes, Davis & Soloway

[57] ABSTRACT

A picture image scanning and reproducing method capable of operating a picture image processing unit at a constant system clock even when the data transferring speed for digital picture image signals obtained by scanning an original or the data transferring speed in a picture image recording unit is changed, as well as a system suitable for use in the practice of the above method. Signals can be processed at a constant throughput owing to the provision of frequency changing means respectively at both input and output sides of the picture image processing unit. A single system clock is input to each of various processing circuits, where the system clock is converted to a desired frequency so as to operate the corresponding processing circuit. Therefore, the present invention has materialized simplification of the circuit structure and reduction of the manufacturing cost.

6 Claims, 5 Drawing Figures

PICTURE IMAGE SCANNING AND REPRODUCING METHOD AND SYSTEM THEREFOR

BACKGROUND OF THE INVENTION

1. Field of the Invention

This invention relates to a picture image scanning and reproducing method suitable for practice in color scanners for graphic arts or facsimiles and a system therefor.

2. Description of the Prior Art

In a color scanner, an original is scanned to obtain picture image signals by photoelectric conversion means, the picture image signals are sampled into quantized signals, and the thus-quantized signals are then subjected to a prescribed digital picture image processing.

In each of conventional color scanners, it was necessary to determine the sampling speed (i.e., the sampling frequency) by the reproduced magnification only because among various conditions for picture image reproduction, the sampling unit for each picture pattern, in other words, the shape of each picture element was not required to be a square. It was thus unnecessary to change the sampling speed even when the line width was varied.

It is however extremely desirable that the shape of each picture element is a square if one wants, like in a layout scanner, to store picture elements, which have been sampled out and then subjected to a color correction or the like, temporarily in a large-capacity memory such as disk memory or the like and thereafter to carry out rotation or the like of the picture image at a layout processing unit.

This will hereinafter be described in further detail. FIG. 1 is a drawing showing some sampling units. In FIG. 1, the arrow indicates the main-scanning direction in which the scanning takes place upon rotation of a drum. FIGS. 1(a) and 1(b) illustrate sampling units pertaining to conventional color scanners. Supposing now that scanning lines are drawn at a density of L' lines/cm, the line width then has a dimension determined by $10/L' = w$ (mm). This width is changed in accordance with the level of resolution required for the reproduction of each picture image and the screen ruling. Let's now suppose that a picture image is scanned by two types of scanning lines, one having a width $w_1$ and the other a width $w_2$. Conventionally, it was not required to change the sampling pitch e in the scanning direction. Thus, it was allowed to keep the sampling pitch always constant. This is however not the case when square-shaped picture elements are required as mentioned above. As depicted in FIGS. 1(c) and 1(d), it is necessary to change the sampling pitch to $w_1$ or $w_2$ in the scanning direction as the line width changes to $w_1$ or $w_2$ which is the same as the sampling pitch.

The above change is required in order to follow changes in the screen ruling and the number of scanning lines. Here, there has been developed another problem that the picture image processing unit has to be operated at a different throughput in response to the above-mentioned change to the sampling pitch.

In other words, it becomes necessary to feed different timing signals to respective operation modules in accordance with given requirements as the transferring speed of picture image data to be processed changes.

It is however difficult from the practical viewpoint to generate a variety of timing signals in accordance with various conditions for separation at a timing clock generation circuit and then to send them to the respective operation modules, because many timing signal lines are required and clock signals are thus all delayed.

No particular problem has conventionally been developed where rather fewer operation modules were employed, for example, in such a color scanner that calculations for all color corrections were conducted in accordance with a three-dimensional lookup table using B-, G- and R-signals as inputs. However, the above method becomes more difficult to practice as more operation modules making use of multi-CPU equipped with various functions or like devices are employed. Let's now suppose by way of example that three types of clock signals are required for each operation module. Fifteen types of clock signals are required where there are five modules. If it is necessary to switch over 15 types of basic timings from one to another in accordance with separation conditions, the clock generation circuit is required to produce 15 types of clock signals, each in 15 different ways. This renders the circuit enormous.

It may be contemplated to incorporate a timing unit in each operation module per se, which timing unit is adapted to produce a desired clock from a system clock. Each of such operation modules produces such a desired clock by either dividing or multiplying the system clock. Therefore, many types of system clocks are required. In the case of multiplication in particular, multiplication circuits are required as many as the number of operation modules relying upon multiplication of the system clock. It may be possible to produce such many types of system clocks by the clock generation circuit and then to feed them respectively to the operation modules. However, this renders the clock generation circuit too complex for its actual application.

Therefore, it is extremely desirable to design the picture image processing unit to operate at a constant throughput in every situation.

SUMMARY OF THE INVENTION

The present invention has been completed with the foregoing in view. An object of this invention is thus to provide a picture image scanning and reproducing method capable of operating a picture image processing unit, which can be operated at a constant throughput only or is preferably operated at a constant throughput from the viewpoint of circuit structure, at a constant system clock even when the data transferring speed for digital picture image signals obtained by scanning an original or the data transferring speed in a picture image recording unit is changed, as well as a system suitable for use in the practice of the above method.

In one aspect of this invention, there is accordingly provided a picture image scanning and reproducing method making use of an original scanning unit, a picture image processing unit and a picture image reproducing and recording unit, characterized in that picture image signals obtained by scanning an original are converted to digital signals, the thus-digitized picture image signals are input to the picture image processing unit in such a way that the picture image processing unit can be operated at a constant throughput, means for changing a data-transferring frequency are provided respectively at the input and output sides of the picture image processing unit, and the transfer of the digitized picture image signals in the picture image processing unit is performed in accordance with a clock having a fixed frequency determined independently from the data-transferring frequency.

In another aspect of this invention, there is also provided a picture image scanning and reproducing system equipped with an original scanning unit, a picture image processing unit and a picture image reproducing and recording unit, which system comprises:

digital conversion means for converting picture image signals, which have been obtained by scanning an original, at a sampling speed corresponding to the density of scanning lines at either original or recording side to digital picture image signals;

data-transferring means for receiving data in synchronization with the sampling speed of the digital conversion means and sending the data out at a speed required by the picture image processing unit so as to transfer the digital picture image signals to the picture image processing unit;

clock generating means for operating the picture image processing unit at a constant throughput in synchronization with the scanning speed of the original scanning unit; and data transferring means for receiving data at a speed conforming with the throughput of the picture image processing unit and transferring the data at a speed required by the picture image reproducing and recording unit to the picture image reproducing and recording unit.

According to the present invention, signals can be processed at a constant throughput owing to the provision of frequency changing means respectively at both input and output sides of the picture image processing unit. Furthermore, a single system clock is input to each of various processing circuits, where the system clock is converted to a desired frequency so as to operate the corresponding processing circuit. Therefore, the present invention has materialized simplification of the circuit structure and reduction of the manufacturing cost.

The above and other objects, features and advantages of the present invention will become apparent from the following description and the appended claims, taken in conjunction with the accompanying drawings, in which:

DESCRIPTION OF THE PREFERRED EMBODIMENT

One example of the present invention will hereinafter be described with reference to the accompanying drawings.

Figure 2:
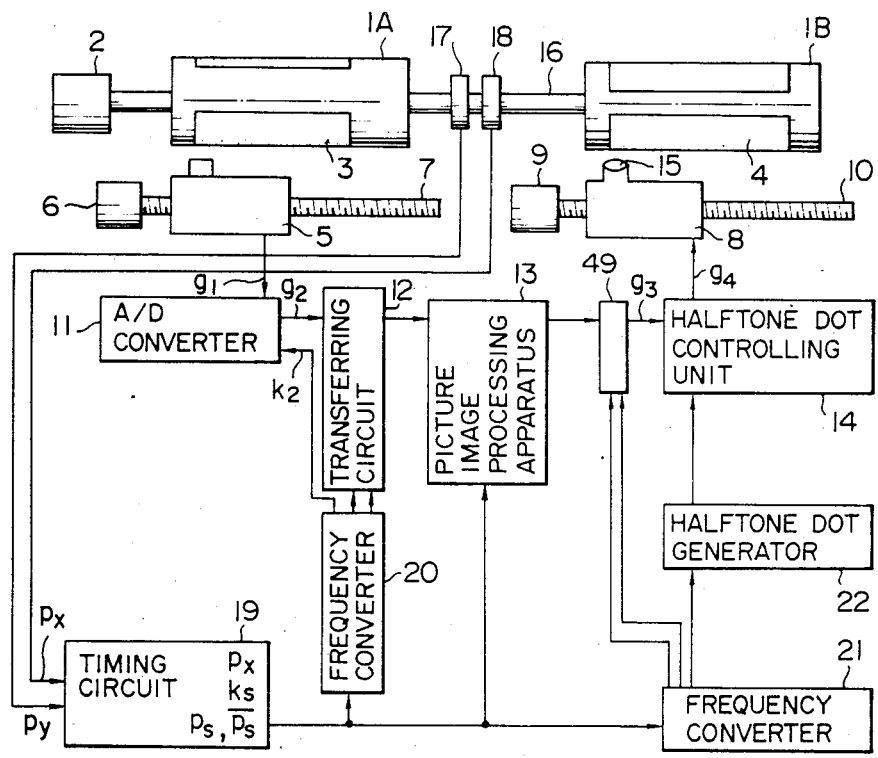
FIG. 2 is a block diagram of a picture image scanning and reproducing system according to one embodiment of this invention.

FIG. 2 is a simplified schematic block diagram of one example of a color scanner for graphic arts, which color scanner pertains to the present invention. An original picture cylinder 1A in an original scanning unit and a recording cylinder 1B in a picture image reproducing and recording unit are rotated coaxially by means of a motor 2. An original 3 and photosensitive material 4 are mounted respectively on the original picture cylinder 1A and recording cylinder 1B.

The original 3 is photoelectrically scanned in the main scanning direction by means of a pickup head 5 upon rotation of the original picture cylinder 1A. It is also scanned in the subscanning direction by displacing the pickup head 5 along the central axis of the cylinder 1A using a motor 6 and feed screw 7.

The photosensitive material 4 such as film or the like is also scanned and exposed in the main scanning direction by a recording head 8 owing to rotation of the recording cylinder 1B. It is also scanned and exposed in the subscanning direction by displacing the recording head 8 along the central axis of the cylinder 1B using a motor 9 and feed screw 10.

Picture image signals $g_1$, which have been obtained as a result of photoelectric scanning of the original 3 by the pickup head 5, are input to an A/D (analog/digital) converter 11 where the signals are converted to digital picture image signals $g_2$.

Thereafter, the digital picture image signals $g_2$ are fed via a first data transferring circuit 12 to a picture image processing apparatus 13, where the signals $g_2$ are subjected to color correction, graded correction and various other signal processings required for reproduction of the picture image. The thus-corrected digital picture image signals are then sent to a second data transferring circuit 49, from which there are output digital picture image signals $g_3$ the data transferring speed of which has been changed.

The digital picture image signals $g_3$ are input to a halftone dot controlling unit 14 provided at the side of the picture image reproducing and recording unit. The halftone dot controlling unit 14 outputs, in accordance with the density level of each digital picture image signal $g_3$, exposure controlling signals $g_4$ so as to record a resulting halftone pattern of a desired percentage halftone dot area.

The halftone dot controlling unit 14 is connected to the recording head 8 to ON-OFF control a plurality of optical paths of an unillustrated exposing light source, thereby to focus a halftone dot picture image on the photosensitive surface of the photosensitive material 4 through a lens 15.

On a drive shaft 16 for the original picture cylinder 1A and recording cylinder 1B, there are mounted a rotary cycle pulse generator 17 capable of producing a single piece of pulse $P_x$ per every single rotation of the cylinders 1A,1B and a rotary phase pulse generator 18 adapted to produce a number of pulses $P_y$ similarly per every single rotation of the cylinders 1A,1B.

Both pulse generators 17,18 are connected to a timing circuit 19, whereby generating a constant system clock $K_s$ in synchronization with the angular velocity of both cylinders 1A,1B.

Numerals 20,21 indicate frequency converters provided respectively at the input and output sides of the picture image processing apparatus 13 so that they generate data transferring clocks.

The frequency converter 20 is connected to the A/D converter 11 and the first data transferring circuit 12 so as to supply a sampling clock, readout clock and writing clock to each circuit.

The frequency converter 21 is connected to a second data transferring circuit 49 and to a halftone dot generator 22 which is in turn coupled with the second halftone dot controlling unit 14.

In the above-constructed picture image scanning and reproducing system of this invention, the data transferring speed of each of the A/D converter 11, halftone dot controlling unit 14 and halftone dot generator 22 varies in accordance with the reproduced magnification, the number of scanning lines and the screen ruling.

However, the picture image processing apparatus 13 which is formed of a plurality of operation modules, for example, a black plate calculation circuit, color correction circuit, gray correction circuit, tone changing circuit, MAX-MIN printing signal correction circuit, rearranging circuit, sharpness emphasizing circuit, etc. may be able to produce internally timing signals required respectively for the modules.

Therefore, the system clock $K_s$ of the timing circuit 19 is fed at a constant frequency to the picture image processing apparatus 13.

Let's now assume by way of example that the frequency of the system clock $K_s$ is $f_s$. Let's also assume that frequencies of $nf_s$ (n: positive integer) and $1/nf_s$ are required respectively for a certain operation module and another operation module. It is possible to generate such frequencies readily and economically when a PLL element constructed as a one-chip IC is used for $nf_s$ and the resulting frequency is divided by a counter circuit to produce $1/nf_s$.

On the other hand, the sampling frequency of the A/D converter 11 varies depending on conditions for separation, namely, the reproduced magnification, the number of scanning lines and the screen ruling. As a result, the transferring speed of the digital picture image signals $g_2$ changes.

Figure 3:
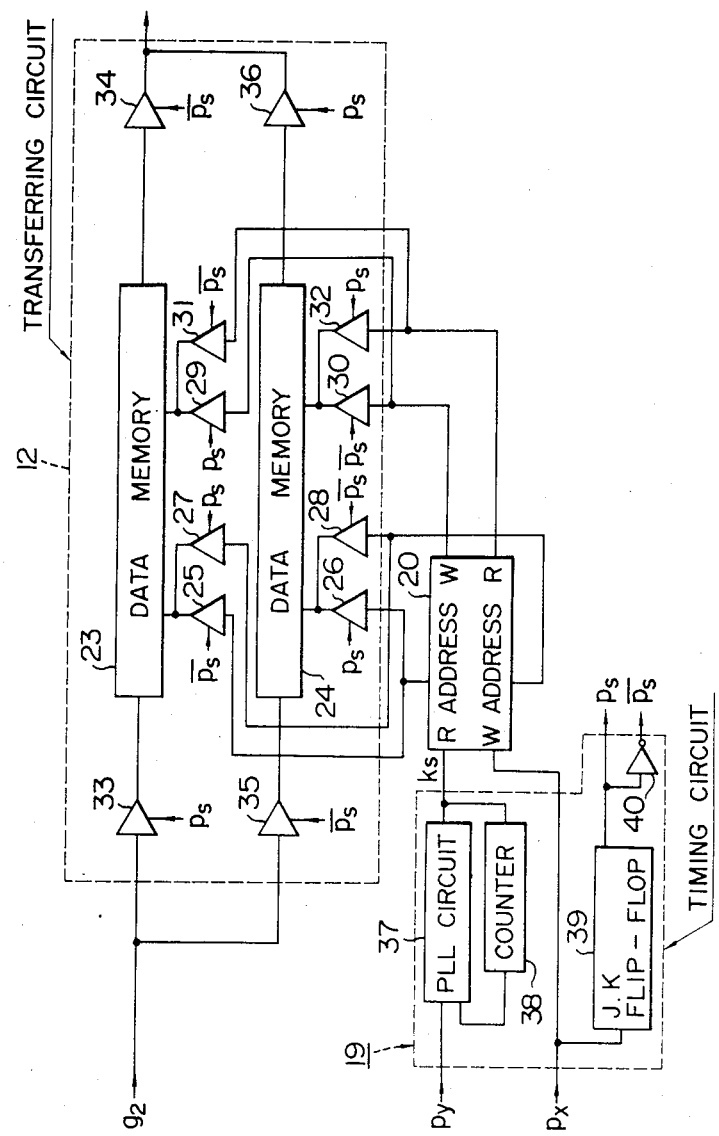
FIG. 3 is a block diagram of one example of a frequency conversion circuit provided at the input side of a picture image processing unit.

In order to input data at a constant data transferring speed to the picture image processing apparatus 13, it is necessary to provide the data transferring circuit 12 equipped with means for changing the data transferring speed, the structure of which circuit is illustrated by way of example in FIG. 3.

In FIG. 3, the data transferring circuit 12 is constructed in such a way that data of a volume equivalent to one line of the picture image signals $g_2$ read out from the original upon a single rotation of the original picture cylinder 1A are input alternately to two data memories 23, 24.

The above structure is used to read out data from the memory 24 while writing data in the memory 23. If only one memory should be relied upon, data may be accidentally lost or overlapped depending on the type of an original and the recording area because the readout operation may be performed before the writing operation has been completed or the writing operation may be effected before the readout operation has not been completed. Therefore, the two data memories are used to avoid such an accident.

On the other hand, the frequency converter 20 is fed with the system clock $K_s$ and rotary cycle pulses $P_x$ each generated periodically upon every single rotation of the original picture cylinder 1A.

Readout address signals (R address) produced at the frequency converter 20 are supplied not only to the address terminal of the first data memory 23 via a bus controller 25 but also to the address terminal of the second data memory 24 via a bus controller 26. On the other hand, writing address signals produced by the frequency converter 20 are fed not only to the address terminal of the first data memory 23 through a bus controller 27 but also to the address terminal of the second data memory 24 by way of a bus controller 28.

To the control terminals of the bus controllers 26, 27, there are fed control signals $P_s$. On the other hand, control signals $\overline{P_s}$ obtained by merely inverting the former control signals $P_s$ at an inverter circuit 40 are supplied to the control terminals of the bus controllers 25, 28.

Writing drive signals W produced at the frequency converter 20 are fed to the R/$\overline{W}$ terminal of the first data memory 23 by way of a bus controller 29 when $P_s$ is "H" or to the R/$\overline{W}$ terminal of the second data memory 24 via a bus controller 30 when $P_s$ is "L", in other words, $\overline{P_s}$ is "H".

Readout drive signals R produced by the frequency converter 20 are fed to the R/$\overline{W}$ terminal of the first data memory 23 via a bus controller 31 when $P_s$ is "L", in other words, $\overline{P_s}$ is "H" or to the R/$\overline{W}$ terminal of the second data memory 24 by way of a bus controller 32 when $P_s$ is "H".

To the control terminals of the bus controllers 29, 32, the control signals $P_s$ are supplied. On the other hand, the control signals $\overline{P_s}$ are fed to the control terminals of the bus controllers 30, 31.

Data ON-OFF switches 33, 34 are provided respectively at the input and output sides of the first data memory 23, whereas data ON-OFF switches 35, 36 are provided respectively at the input and output sides of the second data memory 24. The control signals $P_s$ and control signals $\overline{P_s}$ are fed respectively to the data ON-OFF switches 33, 36 and the data ON-OFF switches 34, 35. Accordingly, the picture image signals $g_2$ are alternately written line by line in the data memories 23, 24 and are alternately read out line by line from the data memories 23, 24.

Namely, when $P_s$ is "H", the memory 23 is written in while the memory 24 is read out. On the other hand, when $\overline{P_s}$ is "H", the memory 23 is read out whereas the memory 24 is written in.

The system clock $K_s$ to be supplied to the frequency converter 20 is generated by a phase-locked loop (PLL) circuit 37 and counter 38, both built in the timing circuit 19.

Namely, the rotary phase pulses $P_y$ are input to the PLL circuit 37. At the same time, there is established a feedback loop connected from the output terminal of the PLL circuit 37 to the its input terminal via the counter 38 having a dividing function of 1/N. Therefore, the timing circuit 19 produces the system clock $K_s$.

On the other hand, the rotary cycle pulses $P_x$ are fed not only to the frequency converter 20 but also to a J-K flip flop 39. Therefore, there are formed the control signals $P_s$ and via the inverter circuit 40 the control signals $\overline{P_s}$.

Within the frequency converter 20, a sampling clock $K_2$ which will herein be described is produced. The sampling clock $K_2$ is fed to the A/D converter 11. The frequency of the sampling clock $K_2$ and that of another clock adapted to drive an address counter for writing data in the data memory 23 or 24 and at the same time to produce writing drive signals are identical to each other.

The relationship between the sampling clock $K_2$ and that of a readout drive clock will be described herein. The readout drive clock is produced using the above-described PLL circuit.

Owing to the provision of the thus-constructed frequency conversion circuit, the digital picture image signals g₂ to be input to the picture image processing apparatus 13 from the A/D converter 11 are alternately written in the data memories 23,24 in accordance with separation conditions for a picture image to be reproduced.

By the way, the readout of the thus-stored signals is performed in accordance with the system clock $K_s$ having the independently-fixed frequency. Accordingly, it is possible to operate the picture image processing apparatus 13 at the constant frequency.

Let's now suppose that the reproduced magnification of the reproduced picture image, the number of scanning lines and a specific number of scanning lines (for example, 200 lines/cm) be respectively M, L and $L_o$. When the frequency $f_s$ of the system clock $K_s$ is fixed, the sampling frequency $f_2$ may be expressed by the following equation (1):

$$f_2 = L/L_0 \times f_s \times M \quad (1)$$

On the other hand, the output frequency $f_3$ may be represeted by $L/L_0 \times f_s$.

Namely, $f_2$ is determined in proportion to the product of the number L of scanning lines, the magnifiation M and the clock frequency $f_s$ whereas $f_3$ is determined in proportion to the product of the number L of the scanning lines and the clock frequency $f_s$.

The above circuits may be constructed using high-speed devices and elements. It should however borne in mind that the present invention is not necessarily limited to the use of such high-speed devices and elements. Various values in the illustrated embodiment will hereinafter be given for the sake of exemplary reference.

$K_s(f_s)$: 2μsec (500 kHz)
# of scanning lines: 200 lines/cm (500 lines/inch)
Screen ruling: 70 lines/cm (175 lines/inch)
M: 50–200% [may range from 50% to 1600% by changing the diameter of the original picture cylinder stepwise; In the illustrated embodiment, M is however controlled to have a value of 50–200% in Equation (1)]
Ratio of scanning lines/screening lines: 2–3

These values may be changed in various ways depending on the application purpose of the method or system.

Figure 4:
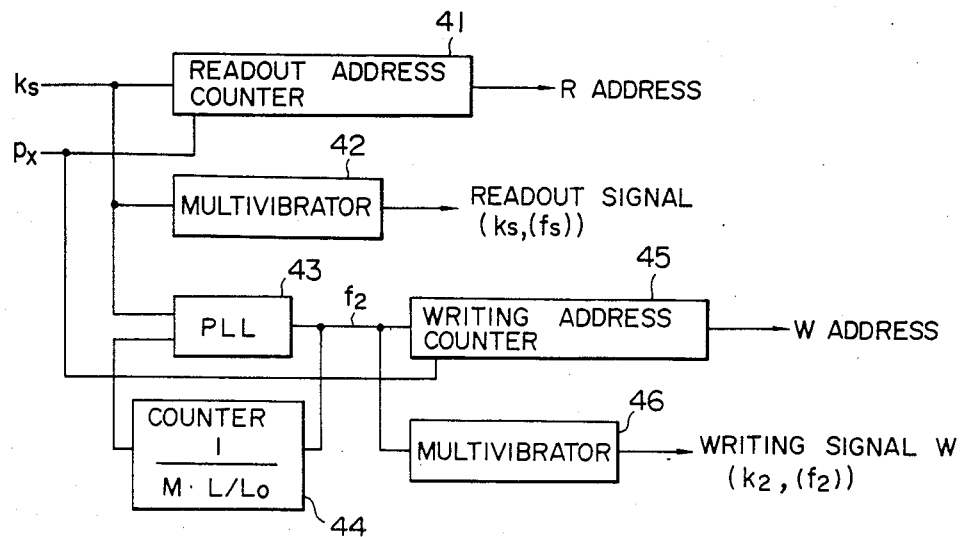
FIG. 4 is a block diagram of one example of the frequency conversion circuit depicted in FIG. 2.

FIG. 4 illustrates by way of example the structure of the frequency converter 20 adapted to determine the sampling density for the A/D converter 11. It is constructed of a PLL circuit 44 and a counter 48 interposed in a loop circuit of the PLL circuit 44 and having a dividing function of $L_o/L$.

In FIG. 4, the system clock $K_s$ is fed (applied) to a read-out address countr 41, an one-shot multivibrator 42 and a PLL circuit 43. A counter 44 provided in a loop circuit of the PLL circuit 43 has a frequency dividing function of $1/M \cdot L/L_o$, so that a clock signal of $f_s \times M \times L/L_o$ which corresponds to the sampling frequency $f_2$ is to be fed to a writing address counter 45 and the one-shot multivibrator 46. The counters 41 and 42 are adapted to reset per every one rotary cycle of the single rotary pulse $P_x$.

A second data transferring circuit 49 is constructed as same as that of the first data transferring circuit 12, and operates same as that of the latter, that is, writing operating to the data memory in the inside thereof is carried out in synchronization with the constant system clock $K_s$, and reading out operating is performed, as described the above, at frequency of $f_s \cdot L/L_o$.

Figure 5:
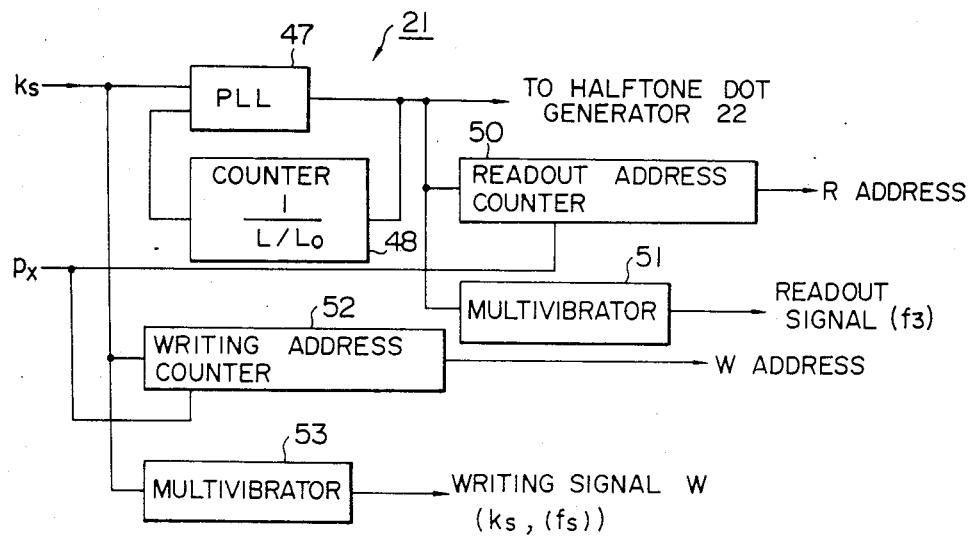
FIG. 5 is a block diagram of one example of the frequency convertor provided at the output side in FIG. 2.

In FIG. 5, there is shown one example of construction of the above-described frequency converter 21 at the output side, which is comprised of a PLL circuit and a counter 48 provided in its circuit and having frequency dividing function of $L_o/L$.

Output of the frequency converter 20 are supplied to the halftone dot generator 22 to generate halftone dots in proportion to the number of scanning lines. These signals are also fed to a counter 50 and one-shot multivibrator 51, whereby producing R address signals and readout signals R for the second data transferring circuit 49.

The halftone dot generator 22 and halftone dot controlling unit 14 are not principal features of the present invention. Known devices may be used as such a generator and unit. Their description is hence omitted herein.

Figure 1:
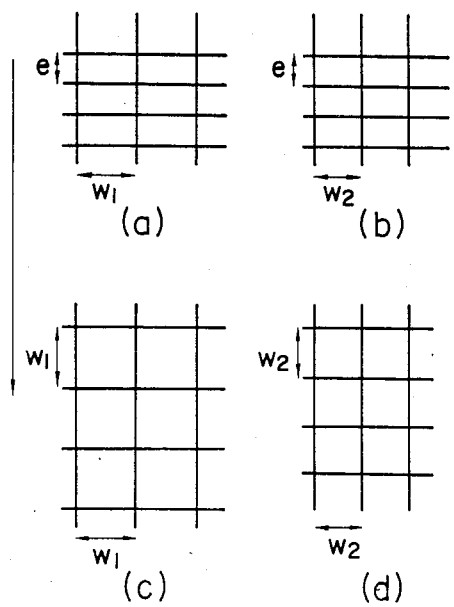
FIG. 1 is a schematic drawing of picture elements showing respective sampling units.

When the width in the main scanning direction and that in the subscanning direction in FIGS. 1(c) and 1(d) are not necessarily be required to be equal to each other, it is possible to make the throughput constant so long as their ratio is constant. Therefore, it is feasible to establish a certain fixed relation in relation to the resolution, the number of scanning lines and the screen ruling.

Having now fully described the invention, it will be apparent to one of ordinary skill in the art that many changes and modifications can be made thereto without departing from the spirit or scope of the invention as set forth herein.

What is claimed is:

1. A picture image scanning and reproducing method making use of an original scanning unit, a picture image processing unit and a picture image reproducing and recording unit, the improvement wherein picture image signals obtained by scanning an original are converted to digital signals, the thus-digitized picture image signals are input to the picture image processing unit in such a way that the picture image processing unit can be operated at a constant throughput, means for changing a data-transferring frequency are provided respectively at the input and output sides of the picture image processing unit, and the transfer of the digitized picture image signals in the picture image processing unit is performed in accordance with a clock having a fixed frequency determined independently from the data-transferring frequency.

2. A picture scanning and reproducing method according to claim 1, wherein the clock to be supplied to the picture image processing unit is subjected to a frequency conversion by a phase-locked loop circuit so as to obtain a sampling pulse for picture image signals obtained by the scanning of the original.

3. A picture scanning and reproducing method according to claim 1, wherein the picture image signals to be supplied to the picture image processing unit are successively fed set by set to a memory device in accordance with the every unit scanning length of the original, and the magnification of a picture image to be reproduced is changed using a clock which performs the transfer of data to the picture image processing unit independently from the frequency of sampling pulses.

4. A picture scanning and reproducing method as claimed in claim 1, wherein when the clock frequency of the picture image processing unit, the sampling frequency of input picture image signals and the transferring frequency of data input as picture image signals already processed by the picture image processing unit to the picture image reproducing and recording unit are represented by $f_s$, $f_2$ and $f_3$ respectively, the sampling frequency $f_2$ is determined in proportion to the product of the width W of each picture element to be reproduced, the magnification M of a picture image to be reproduced and the clock frequency $f_s$ whereas the data-transferring frequency is determined in proportion to the product of W and $f_s$.

5. A picture image scanning and reproducing system equipped with an original scanning unit, a picture image processing unit and a picture image reproducing and recording unit, which system comprises:

digital conversion means for converting picture image signals, which have been obtained by scanning an original, at a sampling speed corresponding to the density of scanning lines at either original or recording side to digital picture image signals;

data-transferring means for receiving data in synchronization with the sampling speed of the digital conversion means and sending the data out at a speed required by the picture image processing unit so as to transfer the digital picture image signals to the picture image processing unit;

clock generating means for operating the picture image processing unit at a constant throughput in synchronization with the scanning speed of the original scanning unit; and data transferring means for receiving data at a speed conforming with the throughput of the picture image processing unit and transferring the data at a speed required by the picture image reproducing and recording unit to the picture image reproducing and recording unit.

6. A picture image scanning and reproducing method making use of an original scanning unit, a picture image reproducing and recording unit, and a picture image processing unit, wherein picture image signals obtained by scanning an original are converted into digital signals, the thus-digitized picture image signals are input to the picture image processing unit in such a way that the picture image processing unit can be operated at a constant throughput, means for changing a data-transferring frequency are provided at the input and output sides of the picture image processing unit, respectively, and the transfer of the digitized picture image signals in the picture image processing unit is performed in accordance with a clock having a fixed frequency determined independently from the data-transferring frequency, characterized in that when the clock frequency of the picture image processing unit, the sampling frequency of input picture image signals and the transferring frequency of data input as picture image signals already processed by the picture image processing unit to the picture image reproducing and recording unit are represented by $f_s$, $f_2$ and $f_3$, respectively, the sampling frequency $f_2$ is determined in proportion to the product of the width W of each picture element to be reproduced, the magnification M of a picture image to be reproduced and the clock frequency $f_s$, whereas the data-transferring frequency is determined in proportion to the product of W and $f_s$.

* * * * *